United States Patent
Toyama et al.

(10) Patent No.: US 7,966,301 B2
(45) Date of Patent: Jun. 21, 2011

(54) SYSTEM AND METHOD FOR EMPLOYING A GRID INDEX FOR LOCATION AND PRECISION ENCODING

(75) Inventors: Kentaro Toyama, Redmond, WA (US); Ron Logan, Everett, WA (US)

(73) Assignee: Planeteye Company ULC, Toronto, Ontario (CA)

( * ) Notice: Subject to any disclaimer, the term of this patent is extended or adjusted under 35 U.S.C. 154(b) by 2163 days.

(21) Appl. No.: 10/673,111

(22) Filed: Sep. 26, 2003

(65) Prior Publication Data

US 2004/0225665 A1 Nov. 11, 2004

Related U.S. Application Data

(60) Provisional application No. 60/469,314, filed on May 9, 2003.

(51) Int. Cl.
*G06F 7/00* (2006.01)
*G06F 17/00* (2006.01)

(52) U.S. Cl. ........ 707/696; 707/736; 707/791; 707/802; 702/2

(58) Field of Classification Search .................. 382/263; 395/601; 702/14; 370/331; 701/201
See application file for complete search history.

(56) References Cited

U.S. PATENT DOCUMENTS 5,647,058 A * 7/1997 Agrawal et al. .................. 707/1

(Continued)

FOREIGN PATENT DOCUMENTS

EP 838764 A2 * 4/1998

OTHER PUBLICATIONS

Steed, Braud and Koehler (2002). VGRID: A Generic, Dynamic HDF5 Storage Model for Environmental, Grid Data, *Presented at the Oceans 2002 Conference and Exhibition*, Biloxi, MS. NRL/PP/7440-02-1003, Oct. 29-31.

(Continued)

*Primary Examiner* — Giovanna Colan
(74) *Attorney, Agent, or Firm* — Wiley Rein LLP

(57) ABSTRACT

A system and method for combining the precision estimate of a database entry's coordinate value such that the precision information is included as part of the one-dimensional index. This is done by constructing a hierarchical index in which the size of the grid is related to the precision of the coordinate value. A grid index is a gridding of an n-dimensional space into a regular partition of the grid space into grid units, for which for a point in space, x, there is a function index (x), which retrieves a unique integer value for the grid that contains Point x, and a function coordinate (y, s), which returns a point associated with the index y at scale s. A hierarchical grid index is effectively a number of grid indices overlaid on the same space, with grid units of different sizes. In this case, each of the functions employs an additional argument that specifies the size of the grid unit to use. Thus, assuming that the grid size, s, is drawn from a set of grid sizes, S, Index (x,s) returns a unique integer value for the grid of size s that contains Point x. Hierarchical indexes may be used to enhance the performance of database queries. A query that seeks results from a small grid size, $s_{small}$, does not seek matches at a large grid size, $s_{large}$. Similar calculations can be performed for a finite area A.

27 Claims, 7 Drawing Sheets

U.S. PATENT DOCUMENTS

| | | | |
|---|---|---|---|
| 5,822,751 | A | 10/1998 | Gray et al. |
| 6,308,177 | B1 | 10/2001 | Israni et al. |
| 6,333,924 | B1 * | 12/2001 | Porcelli et al. ............... 370/331 |
| 6,370,476 | B1 * | 4/2002 | McBride ......................... 702/14 |
| 6,603,885 | B1 * | 8/2003 | Enomoto ..................... 382/263 |
| 6,700,574 | B1 | 3/2004 | Song |
| 2003/0182052 | A1 * | 9/2003 | DeLorme et al. ............ 701/201 |

OTHER PUBLICATIONS

European Search Report, Application No. EP4008439.4, completed Mar. 10, 2006, received Mar. 17, 2006.

Dutton, G., Geodesic modeling of planetary relief, *Laboratory for Computer Graphics and Spatial Analysis*, Graduate School of Design, Harvard University, pp. 188-207.

Goodchild, M. F., Y. Shiren, A hierarchical spatial data structure for global geographic information systems, *CVGIP: Graphical Models and Image Processing*, Jan. 1992, vol. 54, No. 1, pp. 31-44.

Bahl, P. and V. N. Padmanabhan, RADAR: An in-building RF-based location and tracking system, *IEEE INFOCOM 2000*, 2000, Tel-Aviv, Israel.

Bederson, B. B., Quantum treemaps and bubblemaps for a zoomable image browser, *CHI Letters*, 2001, vol. 3, No. 2, pp. 71-80.

Cadiz, J. J., G. Venolia, G. Jancke, and A. Gupta, Designing and deploying an information awareness interface, *Proc. CSCW*, 2002, pp. 314-323.

Christel, M. G., A. M. Olligschlaeger, and C. Huang, Interactive maps for a digital video library, *IEEE Multimedia*, 2000, vol. 7, No. 1, pp. 60-67.

Diomidis, D. S., Position-annotated photographs: A geotemporal web, *IEEE Pervasive Computing*, 2003, vol. 2, No. 2, pp. 72-76.

Dutton, G., Encoding and handling geospatial data with hierarchical triangular meshes, *Advances in GIS Research II* (Proc. SDH7, Delft, Holland), London: Taylor & Francis, pp. 505-518.

Duygulu, P., K. Barnard, N. de Freitas, and D. Forsyth, Object recognition as machine translation: Learning a lexicon for a fixed image vocabulary, *Proc. European Conf. on Comp. Vision*, 2002, vol. IV, pp. 97-112.

Gemmell, J., G. Bell, R. Lueder, S. Drucker, and C. Wong, MyLifeBits: Fulfilling the Memex vision, *Proc. ACM Multimedia*, 2002, pp. 235-238.

Kimber, D., J. Foote, and S. Lertsithichai, FlyAbout: Spatially indexed panoramic video, *Proc. ACM Multimedia*, 2001, pp. 339-347.

Lieberman, H., and H. Liu, Adaptive linking between text and photos using common sense reasoning, *Proc. of the $2^{nd}$ Int'l. Conf. on Adaptive Hypermedia and Adaptive Web-Based Systems*, 2002, pp. 2-11.

Mainichi Daily News, http://mdn.mainichi.co.jp/news/archive/200203/21/20020321p2a00m0fp003000c.html, Mar. 21, 2002.

MapPoint online maps, http://www.mappoint.com.

North, C., and B. Shneiderman, A taxonomy of multiple window coordinates, University of Maryland, Dept. of Computer Science Technical Report, #CS-TR-3854, 1997.

Red Hen Media Mapper, http://www.mediamapper.com.

Rigaux, P., M. Scholl, A. Voisard, *Spatial Databases with Application to GIS*, Morgan Kaufmann, 2002.

Rui, Y., T. S. Huang and S. F. Chang, Image retrieval: Current techniques, promising directions and open issues, *Journal of Visual Communication and Image Representation*, vol. 10, pp. 39-62.

Sahr, K., and D. White, Discrete global grid systems, *Proc. $13^{th}$ Symp. Interface, Comp. Sci. & Stat.*, 1998, pp. 269-278.

Smeulders, A. W. M., M., Worring, and S. Santini, Content-based image retrieval at the end of the early years, *IEEE Trans. PAMI*, Dec. 2002, vol. 22, No. 12, pp. 1349-1380.

Smith, T. R., A digital library for geographically referenced materials, *IEEE Computer*, 1996, vol. 29, No. 5, pp. 54-60.

USGS UTM fact sheet, http://macs.usgs.gov/mac/isb/pubs/factsheets/fs07701.html.

World Wide Media eXchange, http://wwmx.org.

* cited by examiner (a)          (b)          (c)

| location entity ID | latitude | longitude | scale | scale index | scale index | scale index | ... | scale index | comment |
|---|---|---|---|---|---|---|---|---|---|
| | (optional) | (optional) | (optional) | scale 1 | scale 2 | scale 3 | ... | scale N | (not part of database) |
| 1 | 45.123456 | -121.131141 | 2 | 1 | 3 | null | <null> | null | item specified to continental scale |
| 2 | -45.12346 | 121.1311141 | 2 | 2 | 7 | null | <null> | null | item specified to continental scale |
| 3 | 45.123456 | -121.131141 | N | 1 | 3 | 3 | ... | 3586937 | item specifed to finest scale |
| 4 | 40.987655 | -120.24036 | N | 1 | 3 | 3 | ... | 1285736 | item specifed to finest scale |

FIG. 6

SYSTEM AND METHOD FOR EMPLOYING A GRID INDEX FOR LOCATION AND PRECISION ENCODING

This application claims priority under 35 U.S.C. Section 119(e)(1) of provisional application No. 60/469,314, filed May 9, 2003.

BACKGROUND

1. Technical Field

This invention is directed toward a system and method for location and precision encoding. More specifically, the invention is directed toward a system and method for combining the precision estimate of a database entry's coordinate value such that the precision information is included as part of a one-dimensional index.

2. Background Art

Geographic Information Systems (GIS) are well-organized databases of information catalogued, in part, by their relationship to geography. Often, these databases contain on the order of millions or billions (or more) of data elements, each of which is associated with a particular geographical location. As an example, consider a world-wide photo database, where each photograph is associated with the location where it was taken.

Although modern relational databases perform a variety of algorithmic optimizations to speed up the retrieval of data contained in them, they remain inefficient at particular tasks. For example, databases are relatively poor at performing range queries over more than a single dimension. These are queries of the form, "Retrieve all data in which Value X is between $x_1$ and $x_2$, Value Y is between $y_1$ and $y_2$, and Value Z is between $z_1$ and $z_2$." (Again, modern databases can handle even these types of queries well, if the number of data elements is comparatively small; but as they cannot know the form of the data a priori, they necessarily are designed for generality at the expense of efficiency, and remain inefficient for large amounts of data.)

Furthermore, in some GIS applications, elements are associated with geographical regions at different scales, and queries may be performed over a range of scales. For example, in a photo database, an item may be associated with the city of New York as a whole or more specifically with the city block representing the Empire State Building. In certain kinds of queries, it may be useful to retrieve all items taken at the Empire State Building when querying for photos taken in New York City, but the converse may be undesirable—not all photos taken in New York City will be relevant to a query about the Empire State Building.

Therefore, what is needed is a system and method that can create a database of location-tagged data, for which retrieval performance is optimized for location-based queries at a particular scale and finer, no matter of the massiveness of the database.

SUMMARY

The invention is directed toward a system and method for combining the precision estimate of a database entry's coordinate value such that the precision information is included as part of a one-dimensional index by constructing a hierarchical index in which the size of the grid is related to the precision of the coordinate value.

A grid index is a gridding of an n-dimensional space into a regular partition of the grid space forming grid units, for which for a point in space, x, there is a function index (x), which retrieves a unique integer value for the grid that contains Point x. A hierarchical grid index is effectively a number of grid indices overlaid on the same space, with grid units of different sizes. In this case, each of the functions requires an additional argument which specifies the size of the grid unit to use. Thus, assuming that the grid size, s, is drawn from a set of grid sizes, S, Index (x,s) returns a unique integer value for the grid of size s that contains Point x. Hierarchical indexes are used to enhance the performance of database queries. A query that seeks results from a small grid size, $s_{small}$, does not seek matches at a large grid size, $s_{large}$.

Similar calculations can be performed for a finite area A. That is, a grid index can be used for which for a finite area in space, A, there is a function index (A) which retrieves a unique integer value for a grid that wholly contains Area A.

Generally, to obtain a database wherein the precision estimate of a database entry's coordinate value is combined such that information is included as part of the one-dimensional index, one or more location entities are input into the system and method according to the invention. The grid index series is then computed wherein each grid is represented as a series of grids that incorporate the location of each location entity. This grid index series can then be output to a database.

More specifically, one embodiment of the system and method according to the invention uses an equirectangular projection (also known as "unprojected lat/long"), in which latitude/longitude (lat/long) values of location entities are taken as straight x-y pairs on a Euclidean coordinate system and input into the system. The globe is then gridded at twenty different resolutions, with "square" units whose sides correspond to $20 \times (\frac{1}{2})^r$ degrees, for $0 \leq r < 20$. At the equator, these values correspond to scales ranging from ~240 km down to ~0.5 m. Next, each grid is indexed in raster-scan order. So, a given longitude/latitude coordinate (long, lat), whose measurement error is expected to be normally distributed with standard deviation σ meters would be indexed as follows. First, the longitudinal span in degrees that 3σ meters corresponds to: $d=[180(3\sigma)\cos(lat)]/k\pi$ is determined, where k is the circumference of the earth in meters ($4 \times 10^8$ m). Next the degree-scale of precision, r, is determined to be the discrete unit of resolution that is just larger than d: $r=|-\log_2 d/20|$. Finally, the coordinate (long, lat) is mapped to the index, $$I = \left(\frac{360}{r}\right)\left\lfloor\frac{lat+90}{r}\right\rfloor + \left\lfloor\frac{long+180}{r}\right\rfloor.$$

The coordinate as mapped to the index can then be output to a database. To recover the lat/long value, this operation is inverted:

$$lat = \frac{Ir^2}{360} - 90 + \frac{r}{2},$$

$$long = I\% \frac{r^2}{360} - 180 + \frac{r}{2},$$

where '%' is the modulus operator, and the r/2 terms center the returned values in their grid.

The representation described above conveniently packages 2D lat/long coordinates together with precision, and it can be used to index items in a database with a single 8-byte index. If queries are issued for all of the items in a particular grid, it would be necessary to make multiple queries to retrieve items with location tags that are more precise than the given grid. Querying for all items taken over a large area would be computationally expensive and time consuming. To avoid this, twenty fields (one per grid resolution) are used, each of which represents the location of an item at a particular precision. For a given item with (long, lat) and precision $r^*$, $l_r$ is computed, for all $r \geq r^*$; and, for $r < r^*$, a value of null is assigned. This scheme allows one to query for all of the items that are known to occur within a particular grid at precision r, with a single, exact-match query over the field representing location at precision r. Note that items whose location-tag precisions are coarser than that queried for will not be returned, even if the grids intersect (this inverts the standard usage of hierarchical grid indexes).

The system and method according to the invention is advantageous in that it can query very large databases in a fraction of the time it would take to generate a multidimensional query, as would be typical in traditional database schema.

In addition to the just described benefits, other advantages of the present invention will become apparent from the detailed description which follows hereinafter when taken in conjunction with the drawing figures which accompany it.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

DESCRIPTION OF THE DRAWINGS

The specific features, aspects, and advantages of the invention will become better understood with regard to the following description, appended claims, and accompanying drawings where:

In FIG. 4(b), the same grid is projected using equirectangular projection; dark lines further subdivide into 10-degree square grids; grey lines into 5-degree grids. In FIG. 4(c) shows overlapped grids used for greater point accuracy at a given precision. Each of the larger squares represents a single grid at the same precision, but drawn from overlapped grid units. If the dots represent lat/long coordinates of items at the represented precision, then only the dots shown in bold would belong to the grid at the top left.

FIG. 6 depicts an exemplary database structure employed in one embodiment of the system and method according to the invention.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
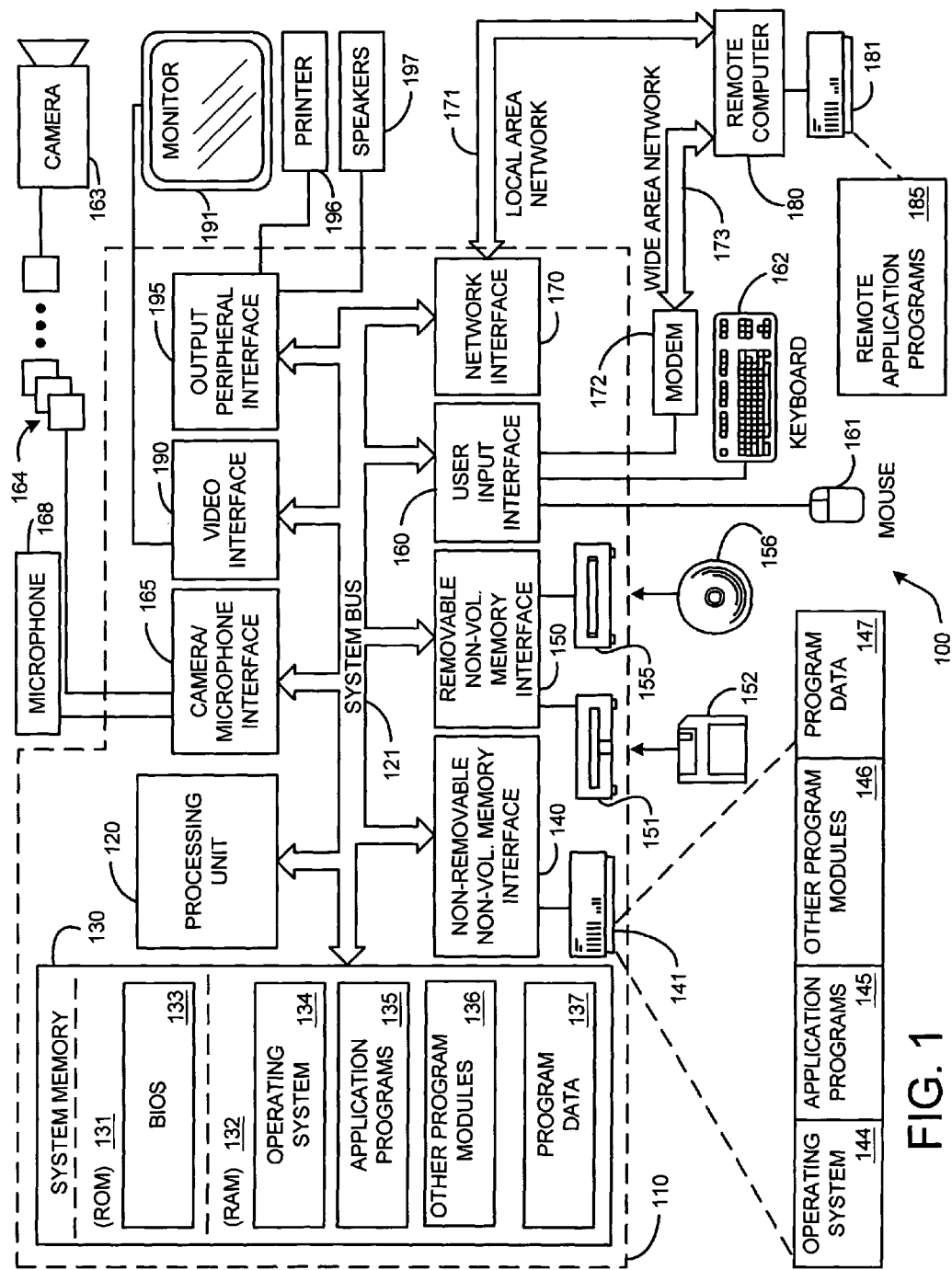
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. A microphone 168 may also be associated with the camera and input into the computer 110 with an interface 165 that is associated with one or more cameras. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method Employing a Grid Index for Location and Precision Coding.

2.1 Overview.

The invention is directed toward a system and method for combining the precision estimate of a database entry's coordinate value such that the precision information is included as part of the one-dimensional index by constructing a hierarchical index in which the size of the grid is related to the precision of the coordinate value. A hierarchical grid index is formed from a number of grid indices overlaid on the same space. A grid index is a gridding of an n-dimensional space into a regular partition of the grid space into grid units, for which for a point in space, x, there is a function index (x), which retrieves a unique integer value for the grid that contains Point x. A hierarchical grid index is effectively a number of grid indices overlaid on the same space, with grid units of different sizes. In this case, each of the functions employs an additional argument which specifies the size of the grid unit to use. Thus, assuming that the grid size, s, is drawn from a set of grid sizes, S, Index (x,s) returns a unique integer value for the grid of size s that contains Point x. Hierarchical indexes are used to enhance the performance of database queries. A query that seeks results from a small grid size, $s_{small}$, does not seek matches at a large grid size, $S_{large}$.

Similar calculations can be performed for a finite area A. That is, a grid index can be used for which for a finite area in space, A, there is a function index (A) which retrieves a unique integer value for a grid that wholly contains Area A.

Figure 2:
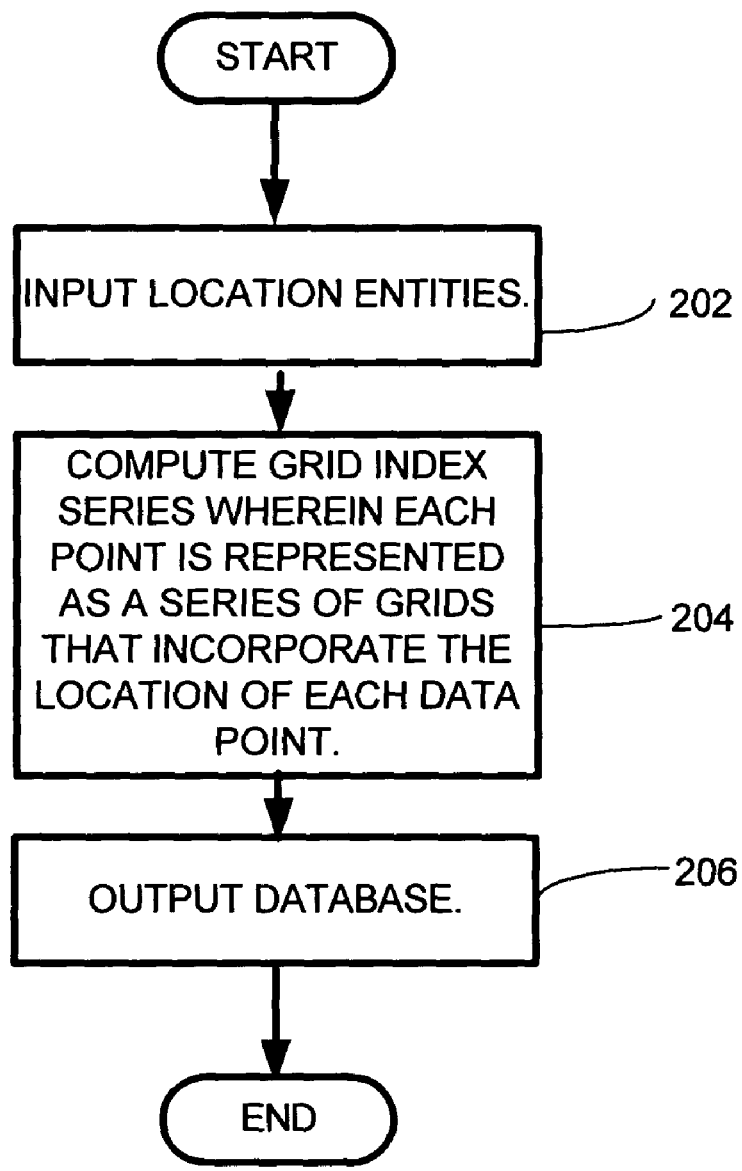
FIG. 2 is a simplified flow diagram of the overall process of generating a database that computes a grid index series wherein each point is represented as a series of grids according to the invention.

FIG. 2 depicts a simplified flow diagram of the process actions of creating a database wherein the precision estimate of a database entry's coordinate value is combined such that information is included as part of the one-dimensional index. This is done by constructing a hierarchical index in which the size of the grid is related to the precision of the coordinate value. In the most general terms, the location entities are input, as shown in process action 202. The location entities can be a point or a finite area. The grid index series is then computed wherein each grid is represented as a series of grids that incorporate the location of each location entity (process action 204). This index series can then be output to a database (process action 206).

The following paragraphs more specifically discuss the system and method according to the invention.

2.2 Location Representation.

Parameters other than two-dimensional location (and time) are necessary to uniquely position a real-world object. These include altitude, up to three degrees of orientation specification, and possibly other parameters, depending on what the object is. In this discussion, examination is restricted to 2D location, as it is a manageable first step towards a broader understanding that incorporates the remaining parameters. However, it should be noted that the system and method according to the invention can process multi-dimensional location information.

Georeferencing, or how location is represented, is a fundamental issue in GIS. Location can be represented in many ways: established place names ("San Francisco"), user-dependent place names ("Grandma's house"), street addresses, zip codes, latitude/longitude coordinates, Euclidean coordinates with respect to some origin, and so forth.

The vast majority of Geographic Information System (GIS) projects use latitude and longitude coordinates—henceforth lat/long—with coordinates defined with respect to the WGS84 standard to specify geographic point coordinates. This scheme is followed as a way of specifying points on the globe because it offers a concise, established way to represent point location.

For the purposes of browsing and interaction, one needs two additional types of location data structures: (1) for maps and queries, a notion of a physical region that corresponds to a map as displayed, and (2) for metadata-tagging, a data type that includes both lat/long coordinates and a measure of precision or resolution.

Maps are most often displayed as rectangles on 2D displays. So, to represent a map, a structure that is called the area type is used, that is defined by a center lat/long, and width and height in kilometers, each measured from the center point and along lines of latitude and longitude. This defines a unique region on the globe that is "rectangular," circumscribed by four great-circle arcs on the 3D globe. When projected onto 2D, an area appears roughly rectangular with sides that may deviate slightly from straight lines depending on the projection type, scale, and position on the globe.

For location tags of data items, one would like to represent lat/long and some indication of precision, to distinguish between an item associated with the Empire State Building, and an item known to be associated only with the coarser label, New York City. The priority is fast retrieval from a database over a potentially massive number of such items. In an off-the-shelf relational database, queries can be optimized if database entries can be indexed by a single number. Thus, the system and method according to the invention employs a scheme that can reduce the three continuous variables of lat/long and precision into a single, discretized index. Spatial data structures that fulfill this criterion are called discrete global grid systems (DGGSs), of which some examples are given in Table 1.

TABLE 1

Candidate Spatial Data Structures for Gridding.

| DGGS | Brief Description | Coordinate-Index Mapping | area-Index Mapping | Areal Variation | Shape Distortion |
|---|---|---|---|---|---|
| Lat/long gridding | Unprojected (long, lat) as cartesian x-y grid | Simple | Medium | High | High at |
| O-QTM [1] | Octahedral facets gridded by equilateral triangles | Medium | Complex | Low | Low |
| Dymaxion [1] | Icosahedral facets gridded by equilateral triangles | Complex | Complex | Low | Low |
| ISEA3H [2] | Equal-area gridding by hexagons and pentagons | Complex | Complex | None | Low |

Figure 3A:
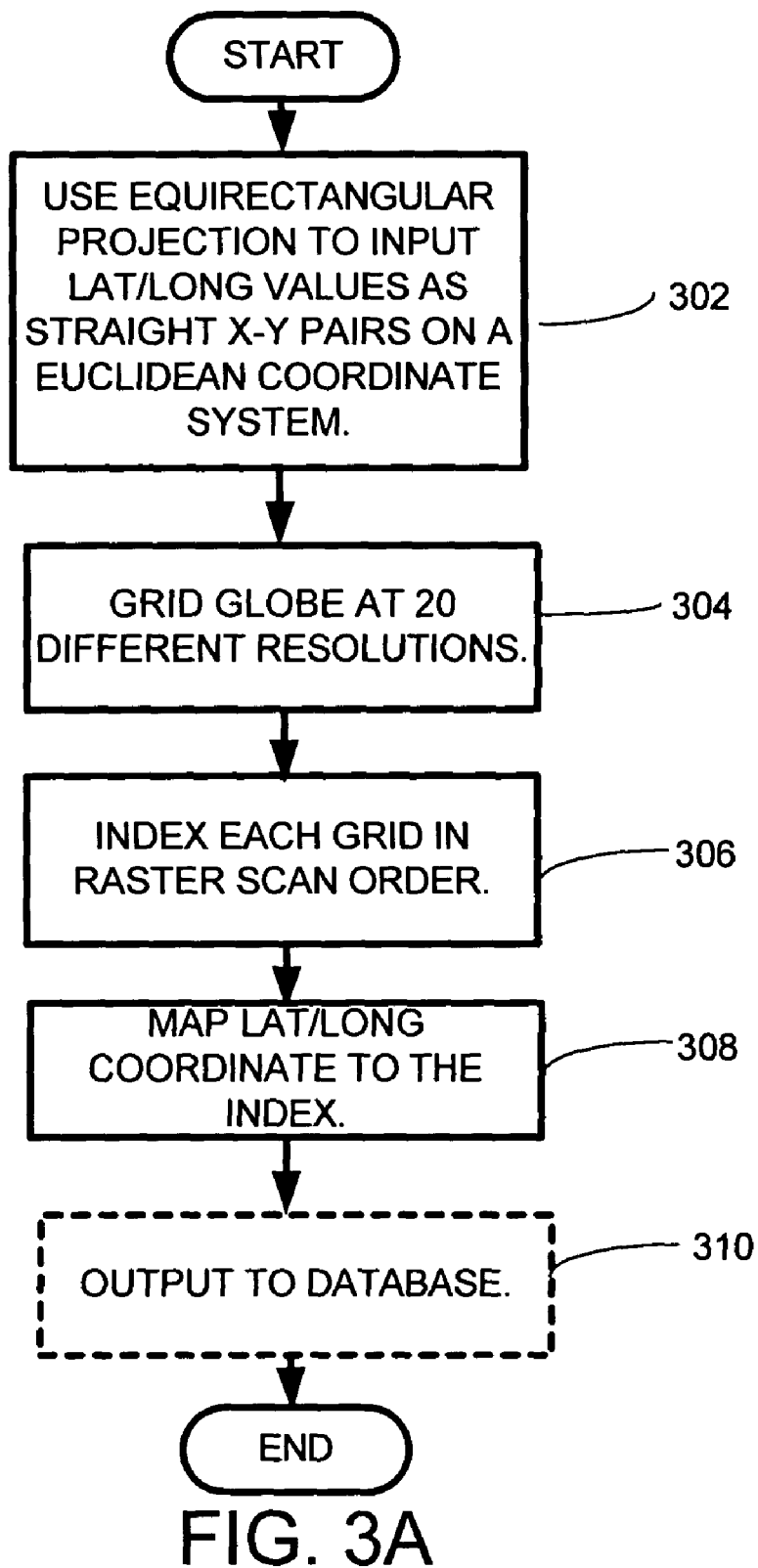
FIG. 3A is a simplified flow diagram of one embodiment of the invention wherein latitude and longitude are represented as x-y pairs on a Euclidean coordinate system and wherein the globe is gridded at 20 different resolutions.
Figure 3B:
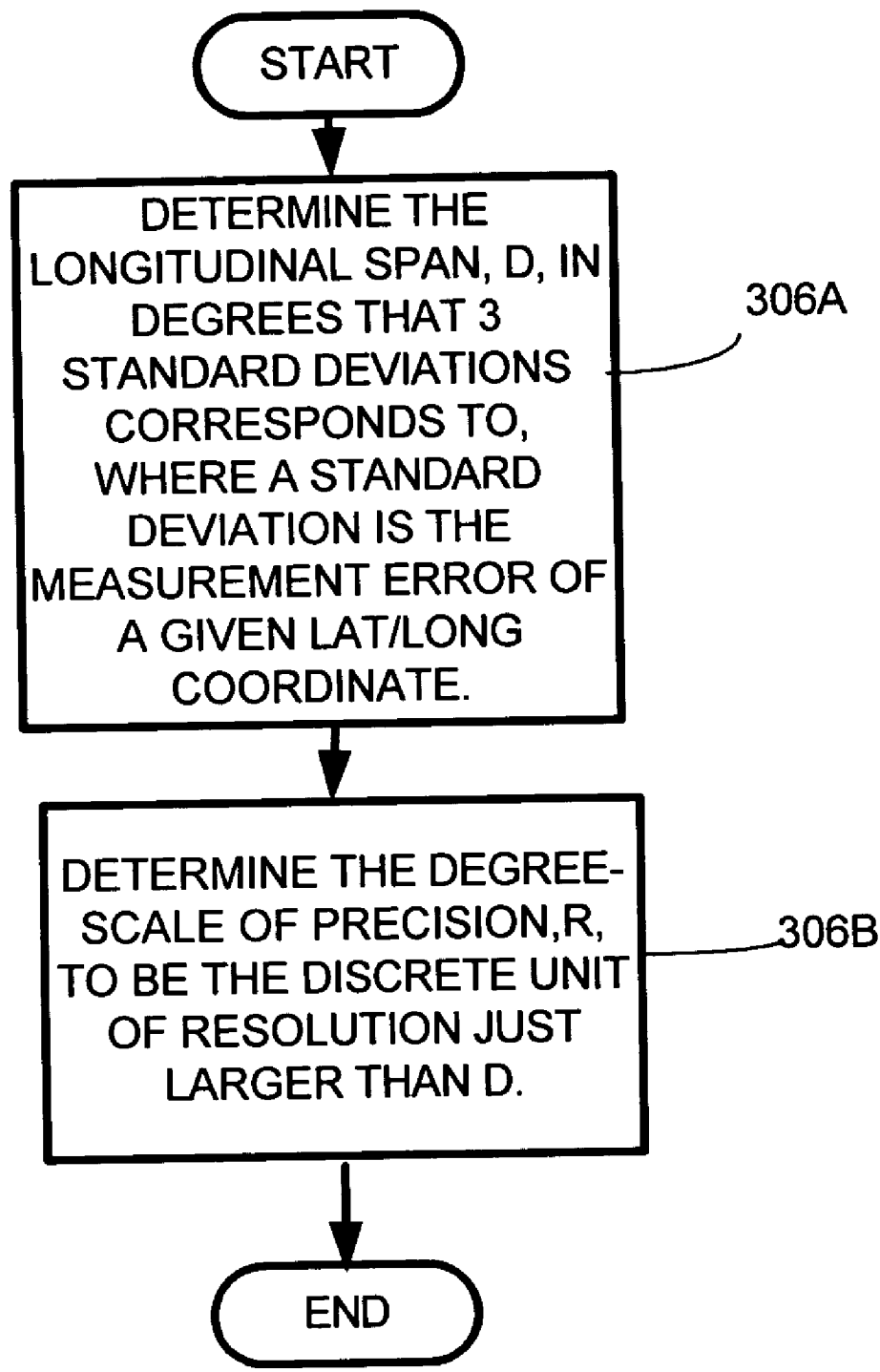
FIG. 3B is a simplified flow diagram of the process action of indexing each grid in FIG. 3A in raster scan order.
Figure 4:
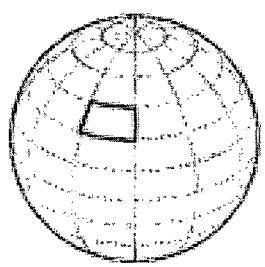
FIG. 4 depicts depicts the gridding for coordinate and precision indexing employed in one embodiment of the invention. The quasi-rectangular region outlined in bold in FIG. 4(a) shows a 20-degree by 20-degree "square" on the globe.
Figure 4:
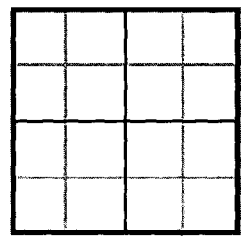
Figure 4:
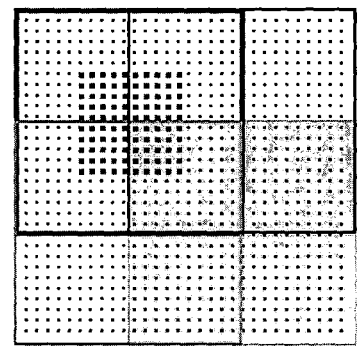

Referring now to FIGS. 3A, 3B and 4, one embodiment of the system and method according to the invention uses an equirectangular projection (also known as "unprojected lat/long"), in which lat/long values are taken as straight x-y pairs on a Euclidean coordinate system (see FIG. 4(b)) and are input into the system (FIG. 3A, process action 302). As shown in process action 304, the globe is gridded at twenty different resolutions, with "square" units whose sides correspond to $20 \times (\frac{1}{2})^r$ degrees, for $0 < r < 20$. FIG. 4(b) shows 20-, 10-, and 5-degree gridding of the region outlined in FIG. 4(a). At the equator, these values correspond to scales ranging from ~240 km down to ~0.5 m. The gridding can occur are greater or fewer resolutions, if more or less precision is required.

Figure 5:
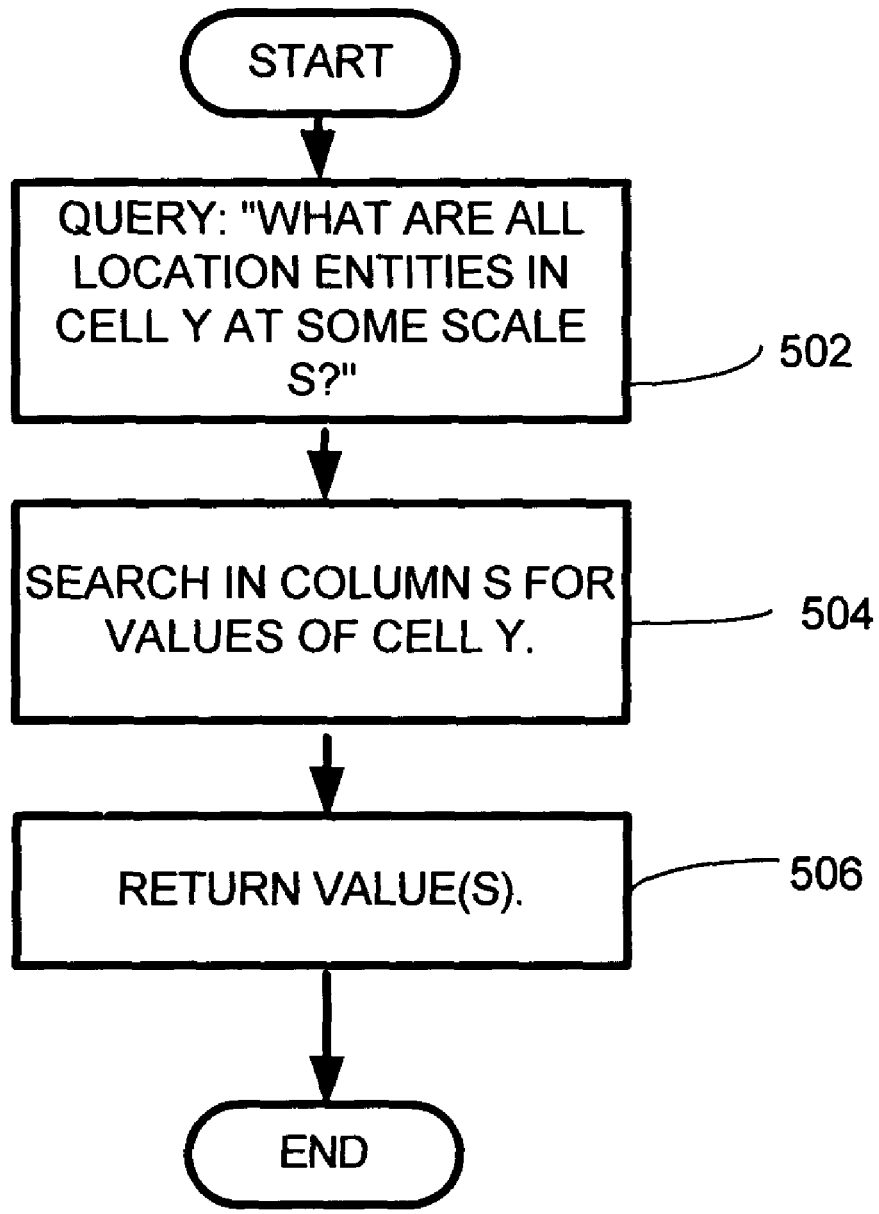
FIG. 5 depicts a flow diagram of a database query used in the system and method according to the invention.

Next, as shown in process action 306, each grid is indexed in raster-scan order. So, a given longitude/latitude coordinate (long, lat), whose measurement error is expected to be normally distributed with standard deviation σ meters would be indexed as follows. First, as shown in FIG. 5, process action 306A, the longitudinal span in degrees that 3 σ meters corresponds to: d=[180(3λ) cos(lat)]/kπ is determined, where k is the circumference of the earth in meters ($4 \times 10^8$ m). Next the degree-scale of precision, r, is determined to be the discrete unit of resolution that is just larger than d: r=|−log$_2$ d/20|, as shown in process action 306B. Finally, as shown in process action 308, the coordinate (long, lat) is mapped to the index, $$l = \left(\frac{360}{r}\right)\left\lfloor\frac{lat+90}{r}\right\rfloor + \left\lfloor\frac{long+180}{r}\right\rfloor. \quad (1)$$

The coordinate as mapped to the index can then be output to a database (process action 310). To recover the lat/long value, this operation is inverted:

$$lat = \frac{lr^2}{360} - 90 + \frac{r}{2}, \quad (2)$$

$$long = l\% \frac{r^2}{360} - 180 + \frac{r}{2},$$

Where '%' is the modulus operator, and the r/2 terms center the returned values in their grid. Of course, because of the floor operations in Eq. (1), one can only recover the value to ±r/2, which conveniently is the precision of the item's location estimate. As r decreases, the precision asymptotically approaches zero, as desired. It is noted that these grids do not generally correspond to physical area objects, but the grid units that occur in a particular area can be easily determining by enumerating units that overlap with an area. If greater accuracy is needed, overlapping grids at each scale could be used, with coordinates mapped to the square whose center is closest (see FIG. 3(c)).

2.3 Grid Types.

Using a square grid with equirectangular projection is intuitive and keeps database queries efficient. But, it is inelegant in that the physical size and shape of grid units at the same indexing scale is distorted, particularly near the poles. Other gridding schemes can be used, however. In one embodiment of the invention a gridding scheme is employed that has minimal areal variation and shape distortion and uses a hierarchical series of equilateral polygons embedded within a Platonic solid. The major advantage of this gridding scheme is that at a fixed scale, units are of similar size and shape. Naturally, the equations for determining the grid index given a coordinate and a coordinate given a grid index must be adapted for these alternate schemes.

2.3 Location Database Schema Design

The representation described above conveniently packages 2D lat/long coordinates together with precision, and it can be used to index items in a database with a single 8-byte index.

If queries are issued for all of the items in a particular grid, it would be necessary to make multiple queries to retrieve items with location tags that are more precise than the given grid. Querying for all items taken over a large area would be computationally expensive and time-consuming.

To avoid this, twenty fields (one per grid resolution) are used, each of which in one embodiment represents the location of an item (e.g., location entity) at a particular precision. For a given item at (long, lat) and precision r*, $l_r$ is computed as in Eq. 1, for all r≧r*; and, for r<r*, a value of null is assigned. This scheme allows one to query for all of the items that are known to occur within a particular grid at precision r, with a single, exact-match query over the field representing location at precision r. Note that items whose location-tag precisions are coarser than that queried for will not be returned, even if the grids intersect (this inverts the standard usage of hierarchical grid indexes). That is, if one is searching for all items taken within a certain Manhattan block, a query for that grid unit will not return an item about which is known only that it was associated somewhere in New York City.

A flow diagram of the process actions of retrieving the desired data from a database of one database configured by the system and method of the invention is shown in FIG. 5. A user queries the database to return all location entities in a given cell y at a given scale S, as shown in process action 502. Column S of the database corresponding to the desired scale is then searched for values of cell y (process action 504) and these values are returned (process action 506). Note that all entities in the database table which occur within the grid represented by cell y will be included in the retrieval results, even those which occur at scales finer than cell y itself.

An exemplary database format for one embodiment of the invention is shown in FIG. 6. The database contains a location entity ID 602 for each entry in the database. Optionally, the latitude and longitude coordinates 604, as well as an indicator representing the grid scale 606, can also be recorded. The scale index at scale 1 provides a single integer that is the grid at a scale 1 that wholly contains the location representation or is set to null if it is not contained (as would be the case if the location representation were a finite area or region instead of a finite point). The scale index at scale 2 provides a single integer that represents a grid cell at a finer resolution than scale 1. And, so forth until scale N. If the finite area is not wholly contained within a given grid cell the scale index is set to a null value for this location representation.

Although this representation requires additional fields in the database, this is outweighed by the gain in performance (nearly tenfold for >1 million rows).

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Diomidis, D. S., Position-annotated photographs: a geotemporal web. *IEEE Pervasive Computing.* 2(2):72-79, 2003.
[2] Sahr, K. and White, D., Discrete Global Grid Systems. In *Proc. 13th Symp. Interface, Comp. Sci. & Stat* 269-78, 1998.

Wherefore, what is claimed:

1. A computer-implemented process for combining a precision estimate of a database entry's coordinate value with the coordinate value into a single index, comprising the process actions of:
   inputting one or more location entities;
   computing a one-dimensional grid index series wherein each location entity is represented as a series of grids that incorporate the location of each location entity; and
   outputting said grid index series to a database.

2. The computer-implemented process of claim 1 wherein the grid index series is constructed from a number of grid indices overlaid on the same space with grid units of different sizes and wherein the size of each grid is related to the precision of the coordinate values of a database entry.

3. The computer-implemented process of claim 1 wherein a location entity is a point.

4. The computer-implemented process of claim 1 wherein a location entity is an area.

5. The computer-implemented process of claim 4 wherein said area is defined by a center latitude and longitude and a width and a height, each measured from the center latitude and longitude and along lines of latitude and longitude.

6. The computer-implemented process of claim 1 wherein equirectangular projection is used to input latitude and longitude values of said one or more location entities as x-y pairs on a Euclidean coordinate system.

7. The computer-implemented process of claim 1 wherein the process action of computing a grid index series comprises:
gridding the globe at a prescribed number of resolutions;
indexing each grid in raster scan order; and
mapping the latitude and longitude coordinates of each location entity to the index.

8. The computer-implemented process of claim 7 wherein the prescribed number of resolutions is 20.

9. The computer-implemented process of claim 7 wherein the process action of indexing each grid in raster scan order comprises:
for each grid,
determining the longitudinal span, D, in degrees that three standard deviations corresponds to, where a standard deviation σ is the measurement error of a given latitude, longitude coordinate; and
determining the degree-scale of precision, R, to be the discrete unit of resolution just larger than D.

10. The computer-implemented process of claim 9 wherein the longitudinal span in degrees that 3 σ meters corresponds to is d=[180(3σ)cos(latitude)]/kπ is determined, where k is the circumference of the earth in meters.

11. The computer-implemented process of claim 9 wherein the process action of determining the degree-scale of precision, R, to be the discrete unit of resolution just larger than D comprises setting $$r = \left| -\log_2 \frac{d}{20} \right|.$$

12. The computer-implemented process of claim 7 wherein the globe is gridded with overlapping grids at each scale in order to increase accuracy.

13. The computer-implemented process of claim 12 wherein coordinates of location entities are mapped to the square whose center is closest.

14. The computer-implemented process of claim 1 wherein the location entity is geographic location data.

15. The computer-implemented process of claim 1 wherein the location entity is described in terms of latitude and longitude.

16. The computer-implemented process of claim 15 wherein the latitude and longitude values are taken as straight x-y pairs on a Euclidean coordinate system.

17. The computer-implemented process of claim 1 wherein the location entity is described in terms of latitude, longitude and altitude.

18. The computer-implemented process of claim 17 wherein the latitude, longitude and altitude values are taken as (x,y,z) coordinate pairs on a Euclidean coordinate system.

19. The computer-implemented process of claim 7 wherein the location entity's coordinates in latitude (lat) and longitude (long) is mapped to the index by $$l = \left(\frac{360}{r}\right) \left\lfloor \frac{lat+90}{r} \right\rfloor + \left\lfloor \frac{long+180}{r} \right\rfloor$$

where r is the degree-scale of precision, and l maps the coordinates to the location entity.

20. The computer-implemented process of claim 19 wherein to recover the latitude and longitude values, the latitude (lat) and longitude (long) is calculated as:

$$lat = \frac{lr^2}{360} - 90 + \frac{r}{2},$$

$$long = l\% \frac{r^2}{360} - 180 + \frac{r}{2},$$

where r is the degree-scale of precision, l maps the coordinates to the location entity, and % is the modulus operator.

21. The computer-implemented process of claim 2 wherein the database comprises a location entity identifier and a scale index for one or more scales each corresponding to a different grid.

22. The computer-implemented process of claim 2 wherein a query of the database comprises the following process actions:
querying which location entities are in a given grid cell at a given grid scale;
searching in the data of the given grid scale for the values of the given grid cell; and
returning said values of the given grid cell at the given grid scale.

23. A computer-readable storage medium having a computer-executable instructions for combining a precision estimate of a database entry's coordinate value with the coordinate value into a single index, said computer executable instructions comprising:
inputting one or more location entities;
computing a one-dimensional grid index series wherein each location entity is represented as a series of grids that incorporate the location of each location entity; and
using the grid index series to perform a query of the location entities such that any query that seeks a match of a location entity at a small grid size does not seek a match of a location entity at a larger grid size than said small grid size.

24. The computer-readable storage medium of claim 23 wherein the instruction computing a grid index series uses an equirectangular projection.

25. The computer-readable storage medium of claim 23 wherein the series of grids grid the globe at twenty different resolutions with "square" units whose sides correspond to 20×(½)r degrees, for 0<=r<20.

26. The computer-readable storage medium of claim 23 wherein the series of grids is a hierarchical series of equilateral polygons embedded within a Platonic solid.

27. The computer-readable storage medium of claim 23 wherein the series of grids is a hierarchical series of polygons that grids the globe.

* * * * *

UNITED STATES PATENT AND TRADEMARK OFFICE
CERTIFICATE OF CORRECTION

| | | |
|---|---|---|
| PATENT NO. | : 7,966,301 B2 | Page 1 of 1 |
| APPLICATION NO. | : 10/673111 | |
| DATED | : June 21, 2011 | |
| INVENTOR(S) | : Kentaro Toyama et al. | |

It is certified that error appears in the above-identified patent and that said Letters Patent is hereby corrected as shown below:

In the claims:

− In claim 19, column 12, line 2, delete "(let)" and insert --(lat)--.

− In claim 25, column 12, line 58, delete "20× (1/2)r degrees, for $0 <= r < 20$", and insert with --$20\times(1/2)^r$ degrees, for $0 \leq r \leq 20$--.

Signed and Sealed this
Eighteenth Day of September, 2012

David J. Kappos
*Director of the United States Patent and Trademark Office*